United States Patent [19]

Fujiwara et al.

[11] Patent Number: 5,225,995
[45] Date of Patent: Jul. 6, 1993

[54] FLOW RATE MEASUREMENT CONTROL FOR REFUELLING CONTROL SYSTEM

[75] Inventors: Shigemasa Fujiwara, Nara; Shoji Uemura; Yasuo Sugishima, both of Soraku, all of Japan

[73] Assignee: Sharp Kabushiki Kaisha, Osaka, Japan

[21] Appl. No.: 529,757

[22] Filed: May 29, 1990

Related U.S. Application Data

[63] Continuation of Ser. No. 694,977, Jan. 25, 1985, abandoned.

[30] Foreign Application Priority Data

Jan. 27, 1989 [JP] Japan .................................. 59-13933

[51] Int. Cl.$^5$ .............................. B67D 5/14; G01F 1/20
[52] U.S. Cl. .................................. 364/510; 73/861.77; 377/21; 364/465
[58] Field of Search ................. 364/465, 479, 510, 442, 364/509; 222/40, 71, 36, 477; 73/861.77, 861.78; 377/21, 49, 50

[56] References Cited

U.S. PATENT DOCUMENTS

| | | | |
|---|---|---|---|
| 3,913,787 | 10/1975 | Dilger | 222/26 |
| 4,083,387 | 4/1978 | Stieber et al. | 141/95 |
| 4,120,032 | 10/1978 | Mirdodiah | 364/510 |
| 4,247,899 | 1/1981 | Schiller et al. | 377/21 |
| 4,276,999 | 4/1981 | Reichenberger | 364/479 |
| 4,290,538 | 9/1981 | White et al. | 222/25 |
| 4,410,949 | 10/1983 | Huellinghorst et al. | 364/465 |
| 4,545,406 | 10/1985 | King | 364/510 |
| 4,550,859 | 11/1985 | Dow, Jr. et al. | 364/465 |
| 4,595,122 | 6/1986 | Yoshida et al. | 377/21 |

FOREIGN PATENT DOCUMENTS 204895 12/1982 Japan .
2028768 3/1980 United Kingdom .

Primary Examiner—Thomas G. Black
Assistant Examiner—Michael Zanelli

[57] ABSTRACT

A refuel control system is disclosed which may be utilized in a gasoline or other fluid refuelling operation. This system effectively prevents differences in refuelled volume and accurately determines the amount of fluid dispensed. Differences in refuelling operations for a particular dispenser may be due to pressure variations inside a refuel pipe during the initial stages of refuelling and before gasoline is actually flowing through a discharge nozzle. This system involves the use of sub-CPU which reads initialization time data from a host CPU. A motor is then activated to pump fluid to the nozzle after which pulses are generated in response to the flow of gasoline. The sub-CPU receives these pulses and then inhibits counting of these pulses until the time period for that particular pumping operation corresponds to the initialization data. After this period, pulses are then monitored in order to correctly determine the actual amount of gasoline dispensed. The initialization time data may be varied such that this sytem may be made specific to a particular dispenser.

6 Claims, 2 Drawing Sheets

FLOW RATE MEASUREMENT CONTROL FOR REFUELLING CONTROL SYSTEM

This application is a continuation of application Ser. No. 06/694,977 filed on Jan. 25, 1985, now abandoned.

BACKGROUND OF THE INVENTION

The present invention relates to an improved method of the flow-rate measurement control available for a POS (Point of Sales) (or refuel control system) of a gasoline service station. Conventionally, there are two methods of the flow rate control being applied to the refuel control system including; (1) method of directly controlling the motor of the refuel unit, and (2) method of controlling the flow rate. Of these, the latter method can improve accuracy of the refuelling operation. Conversely, this method involves complex configuration of the refuelling units, thus increasing cost.

To solve these problems, some of the prior arts had already proposed such techniques based on the former method that could simplify the overall construction and saves cost as well. Typically, one prior art operation based on the former method had proposed such a system as described below. For example, when installing a new refuelling unit, a specific volume (about 7 liters) of gasoline is discharged to preliminarily determine the actual difference of the flow rate to be made available for the reference of the flow rate difference ($\alpha$) caused by the inertia of the pump motor so that this data can be preset in memory of the control unit. In the actual refuelling operation, the system causes the pump motor to stop upon arrival at the value produced by subtraction of the value ($\alpha$) from the designated refuel volume Q, thus properly controlling the refuel operation. Nevertheless, even after introducing such a new control method wherein a predetermined difference value ($\alpha$) is applied to the refueling operation a significant difference will still occur since the refuelling units themselves were subjected to the degradation of performance characteristics and varying environmental conditions. When refuelling a small amount of gasoline, for example, less than 7 liters, the difference actually tends to increase furthermore. In the light of such a problem, a special refuel control system has been proposed in the Japanese Patent Laid-Open No. 204895 of 1982, which is aimed at a high-precision refuel control which minimizes the difference of the control value. The refuel control system of this Japanese Patent Laid-Open document was designed to securely minimize the difference value ($\alpha$) in its practical applications by considering possible degradation of the mechanical characteristics and variable environmental conditions. More particularly, by presetting the mean value of the difference ($\alpha$) detected during the previously refuelling operations covering the last several rounds, the refuel control system automatically corrects the difference value ($\alpha$) so that the actual difference value can be obtained in response to those varying conditions. However, it was eventually found that even when applying such a control system, it was very hard to precisely correct the difference generated during the initial stage of the refuelling operation. In other words, when the pump motor had been turned on at the start of the refuel operation and while no gasoline was actually fed through the nozzle, a number of unnecessary flow-rate measuring pulses were generated by the flow-rate pulse generator, due to the varied pressure inside the refuel pipe. As a result, an unexpected difference value suddenly appeared during the refuelling operation.

OBJECT AND SUMMARY OF THE INVENTION

In the light of such unwanted discrepancies that still remain unsolved today, it is an object of the present invention to provide a new flow-rate measurement control, device ideally suited for the refuel control system and therefore which can completely eliminate such conventional discrepancies.

To achieve this, the new flow-rate measurement control device effective for the refuel control system provides for a variety of unique means including means for generating the flow-rate pulses provided for the refuel units, memory for storing such data related to time, and means for counting the flow-rate pulses. Using these, the preferred embodiment of the present invention inhibits the counting operation of the flow-rate pulse counter for a specific period of time immediately after the start of the refuelling operation so that no counting can be performed against any of the unnecessary flow-rate pulses immediately after the pump motor turns ON. The preferred embodiment provides such unique control means, i.e., based on the nozzle signal from the refuel units. The controller first causes the sub-CPU to read the non-measurement time data preset in the host CPU, and then inhibits the counting of the flow-rate pulses output from the refuel units for a specific period of time in conjunction with the time data read by the sub-CPU. In addition, such non-measurement time data can be variably set by using input means of the host CPU.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the attached drawings, the preferred embodiments of the present invention are described below.

Figure 1:
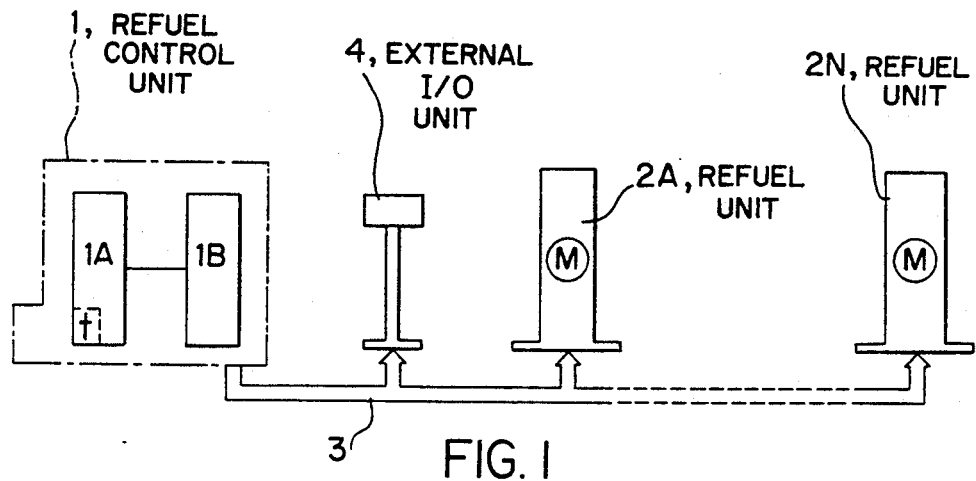
FIG. 1 is a simplified block diagram of the refuel control system reflecting the preferred embodiment of the present invention.
Figure 2:
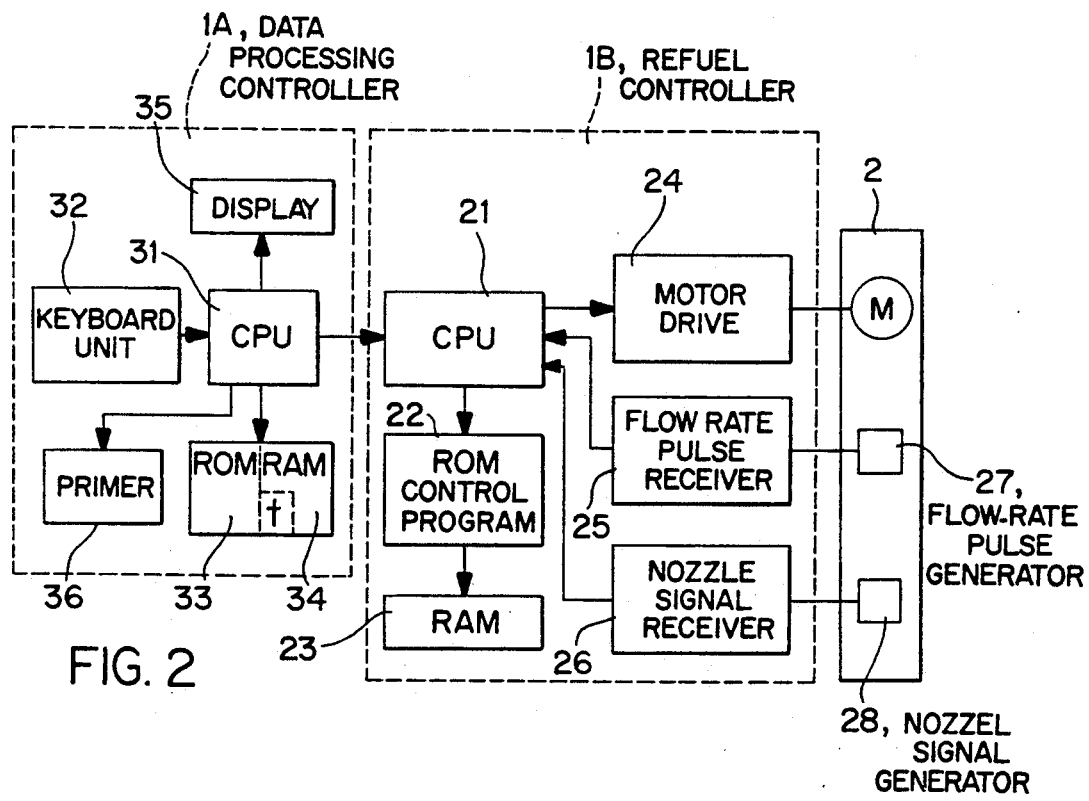
FIG. 2 is the detailed schematic diagram of the refuel control system shown in FIG. 1.

FIG. 1 is a simplified block diagram of the refuel control system reflecting the preferred embodiment of the present invention. In FIG. 1, reference number 1 indicates the refuel control unit (POS) incorporating the controller 1A for processing data and the other controller 1B controlling the entire operations of the refuel units. The abbreviation POS stands for Point of Sales. Reflecting the preferred embodiments, the controller 1A is internally provided with a memory area storing the data related to the non-measurement time against unnecessary flow-rate pulses. Reference numbers 2A through 2N respectively indicate the refuel units, each being connected to the controller 1 via the signal cables 3, while the operations of these refuel units are controlled by the controller 1B. Each of these refuel units incorporates a pump motor M so that the designated volume of gasoline can be supplied to consumers when this motor M is driven. Reference number 4 indicates the externally provided I/O units connected to the refuel controller (POS) 1. FIG. 2 is the detailed schematic diagram showing the relationship between the data-processing controller 1A (host unit), the refuel controller 1B (subordinate unit), and respective refuel units. In FIG. 2, the controller 1B incorporates the sub-CPU 21, ROM 22 storing the control programs, RAM 23 storing various data, the motor driver 24, the flow-rate pulse receiver 25, and the nozzle signal receiver 26. The motor driver 24, the flow-rate pulse receiver 25 and the nozzle signal receiver 26 are all connected to the refuel units 2. The motor driver 24 drives the motor M of the refuel unit 2 in response to the command from the sub-CPU 21. The flow-rate pulse receiver 25 receives the pulse signals corresponding to the refueled volume generated by the flow-rate pulse generator 27, and then delivers these data to the sub-CPU 21. Likewise, the nozzle signal receiver 26 receives such signals generated in response to the manual opening and closing of the valve of the refuel nozzle 28 of the refuel unit done by the operator, and then delivers these data to the sub-CPU 21. The controller 1A is provided with the keyboard unit 32 that inputs a variety of trade data, the host CPU 31 that processes a variety of data received from the keyboard 32 in accordance with programs stored in ROM 33, RAM 34 that stores a variety of data processed by the host CPU 31, a display 35 and a printer 36 that prints and records a variety of the processed data. RAM 34 is provided with a memory area "t" that stores the non-measurement time data in conjunction with unnecessary flow-rate pulses.

Figure 3A:
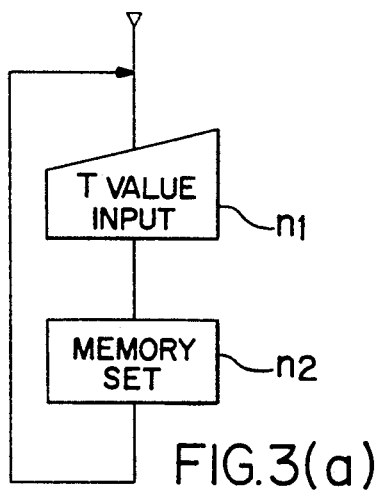
FIG. 3a is a flowchart describing stepwise operations of entry of the non-measurement time data of the present invention.
Figure 3B:
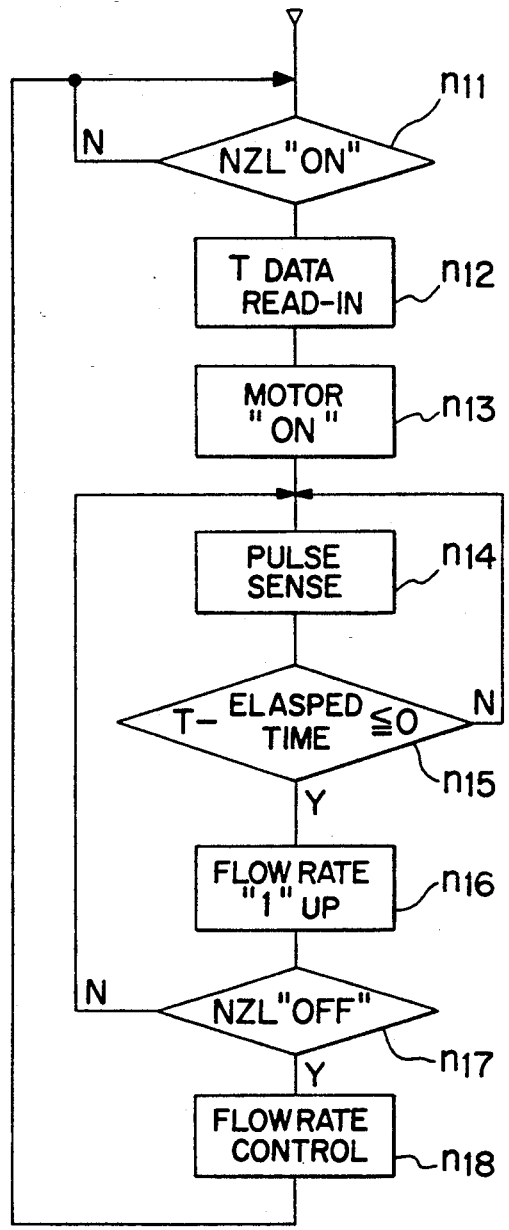
FIG. 3b is a flowchart describing measuring of the actual flow rate of gasoline of the present invention.
Figure 3C:
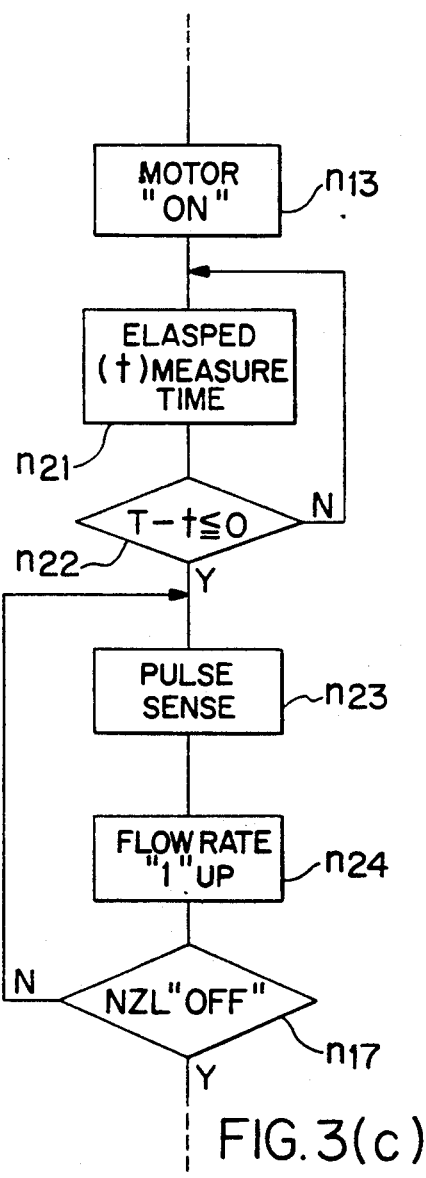
FIG. 3c is a flowchart describing another embodiment of the present invention wherein the flow-rate pulse counting is inhibited.

Next, referring now to FIG. 3 (a) and (b), the refuel control operations according to the preferred embodiment of the present invention will not be described. FIG. 3 (a) and (b) are respectively the flowcharts describing the operations of the refuel control system embodied by the present invention. First, referring to the flowchart of FIG. 3 (a), a method related to the entry of the non-measurement time data will be described.

(1) Method of presetting the non-measurement time data (a)

First, by operating the keyboard 32 of the controller 1A, the controller operator inputs a non-measurement time data T (denoting such a period until gasoline actually reaches the nozzle 28 after activating the pump motor M, 0.8 second for example) into memory area "t" of RAM 34 via the host CPU 31 (steps n1 and n2). It is ideal to preset the non-measurement time data T at 100 meters per second of the flow rate, within a range from 0.5 through a maximum of 1.0 second. When entering the non measurement time data T, a variety of conventional data including the unit prices of petroleum products can also be input into a specific area of RAM 34. Next, referring to the flowchart of FIG. 3 (b), method of measuring the actual flow rate of gasoline is described below.

(2) Method of measuring flow rate (b)

When the refuel operator activates the nozzle 28 of the refuel unit, the signal activated by the nozzle 28 is transmitted to the sub-CPU 21 through the nozzle signal receiver 26, thus allowing the sub-CPU 21 to identify the nozzle-activated signal (step n11). The sub-CPU 21 then advises the host CPU 31 that the nozzle 28 has been activated. On receipt of this advising signal, the host CPU 31 reads the non-measurement time data T from memory area "t" of RAM 34, and simultaneously, the host CPU 31 also reads various data needed for this transaction from a specific area of RAM 34 for delivery to the sub-CPU 21. After receiving the non-measurement time data T and other needed data (step n12, the sub-CPU 21 then activates the pump motor M via the motor driver 24 (step n13) to allow the refuel operation to start up. Simultaneously, the sub-CPU 21 counts the elapsing time after the activation of the pump motor M. The sub-CPU 21 receives the flow-rate pulses from the refuel unit 2 through the flow-rate pulse receiver 25 and identifies it (step n14). The sub-CPU 21 doesn't immediately count the incoming flow-rate pulses, but it starts to count these pulses as the measurable data only after the time elapsed from the activation of the pump motor M has just reached the non-measurement time T (steps n15 and n16). After completing the designated refuel operation by repeating the above procedures, the nozzle 28 is closed. When this state is identified by the sub-CPU 21 (step n17), the sub-CPU 21 then delivers the measurement data to the host CPU 31, and as a result, the host CPU 31 starts to execute all the needed operations to complete this transaction (step n18).

These serial operations are performed in each refuel operation. The refuel control system incorporating the preferred embodiment of the present invention inhibits the flow-rate pulse counting operation only for a specific period of time T immediately after the activation of the pump motor M.

Alternatively, as shown in FIG. 3 (c), another preferred embodiment inhibits the flow-rate pulse counting operation either by inhibiting the sub-CPU 21 to detect the incoming flow-rate pulses until the elapsed time "t" reaches the non-measurement time T after activation of the pump motor M or by inhibiting the input of the flow-rate pulses into the sub-CPU 21, thus substantially disabling the flow-rate pulse counting until the time elapsed from the activation of the pump motor M exactly reaches the non-measurement time T (steps n21 through n24). As a result, the non-measurement time data T stored in the host CPU in reference to the nozzle signal from the refuel unit is read by the sub-CPU 21. Thus, it is possible to securely inhibit the counting of the flow-rate pulses sent from the refuel unit in conjunction with the non-measurement time data T, and as a result, undesired counting of the unnecessary pulses at the time of activating the pump motor M can be effectively prevented.

As is clear from the above detailed description, since the preferred embodiments of the present invention effectively inhibit the counting operation of the flow-rate pulses for a specific period of time at the initial stage of the refuel operation, unwanted counting of unnecessary flow-rate pulses during the refuel operation can be securely prevented, thus realizing a highly accurate measurement of the refueled volume throughout routine services.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flow-rate measurement system comprising:
   a plurality of refuel units for selectively discharging a flow of fluid from an outlet in one of the refuel units to be receiver during a refuel operation;
   a motor for pumping said fluid from the refuel unit, said motor being selectively driven to stop and start said flow of fluid for each refuel operation and being operatively connected to one of said refuel units;
   a flow-rate pulse generator for generating pulses in response to fluid flowing from said refuel unit, said flow-rate pulse generator being incorporated in said refuel unit, the flow-rate pulse generator beginning to generate pulses when the motor starts;
   data control means for storing at least initialization data and trade data in a memory in said data control means, said initialization data corresponding to time for fluid to reach the outlet of said refuel unit after said fluid flow starts, the time begin selected by a user and the data control means further comprising means for the user to input the time; and
   refuel control means for controlling the flow of fluid from the refuel unit by selectively driving said motor, said refuel control means reading said initialization data from said data control means and counting time from which the motor initially pumps said fluid for each of the refuel operations, said refuel control means determining when said initialization data corresponds to said time from flow initialization and thereafter counting the pulses generated by said flow-rate generator such that at least the pulses generated by the starting of the motor are excluded from the pulses counted by the refuel control means.

2. The flow-rate measurement control system of claim 1, wherein said fluid is gasoline.

3. The flow-rate measurement control system of claim 1, wherein said trade data stored in the data control means comprises a price per unit of fluid and said data control means further calculates a total amount of fluid discharged from said refuel unit based upon the number of pulses counted, said data control means then outputs a price for an amount of fluid dispensed by said refuel unit, said amount of fluid being dispensed between starting and stopping of said motor.

4. The flow-rate measurement control system of claim 1, wherein said refuel unit further includes a transaction signal generator and said refuel control means further includes a transaction signal receiver, said signal generator generates a start signal when said refuel unit is ready to dispense fluid and a disconnect signal when said refuel unit is unable to dispense fluid, and the transaction signal receiver receives said start and disconnect signals and uses these signals in the control of the flow of fluid.

5. A method for controlling flow of fluid from a refuel system, said method including the steps of:
   presetting initialization data and trade data into a data controller by user input to the data controller;
   activating one of a plurality of dispensers for dispensing fluid to a receiver for each refuel operation;
   sending a start signal to a refuel controller after said dispenser is activated, said start signal indicating the beginning of one refuel operation;
   sending an advising signal from the refuel controller to the data controller in response to the start signal, the advising signal informing the data controller that the dispenser has been activated for a refuel operation;
   reading the initialization data from said data controller to said refuel controller in response to the advising signal, said initialization data being sent from the data controller to the refuel controller for each refuel operation;
   activating a motor to pump said fluid to said dispenser;
   generating pulses at said dispenser in response to activating of the motor;
   dispensing said fluid from said dispenser to a receiver;
   continuing generating pulses at said dispenser in response to the flow of fluid;
   sending said pulses from said dispenser to said refuel controller;
   determining in said refuel controller when a period of time elapses corresponding to a period of time contained in the initialization data;
   terminating the flow of fluid when a desired amount of fuel is dispensed;
   counting the pulses sent to the refuel controller only after said period of time has elapsed, said counting being carried out after said period of time elapses and until said terminating of the flow of fluid;
   sending a number of pulses counted from the refuel controller to the data controller, the number of pulses sent excludes the pulses resulting from activating of the motor; and
   determining an amount of fluid dispensed from said dispenser based on a number of counted pulses such that the amount of fluid actually dispensed may accurately be determined for each refuel operation.

6. The method for controlling flow of fluid as recited in claim 5, further comprising the steps of calculating transaction data after said amount of fluid dispensed is determined, said transaction data being based on the total amount of fluid dispensed and a price per unit of fluid and including the total price of the amount of fluid dispensed.

* * * * *